United States Patent
Xu

(10) Patent No.: US 11,765,721 B2
(45) Date of Patent: Sep. 19, 2023

(54) CHANNEL MONITORING METHOD AND APPARATUS, TERMINAL DEVICE AND NETWORK DEVICE

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD.

( * ) Notice: Subject to any disclaimer, the term of this patent is extended or adjusted under 35 U.S.C. 154(b) by 0 days.

(21) Appl. No.: 17/073,837

(22) Filed: Oct. 19, 2020

(65) Prior Publication Data
US 2021/0037558 A1    Feb. 4, 2021

Related U.S. Application Data

(63) Continuation of application No. PCT/CN2018/097001, filed on Jul. 25, 2018.

(51) Int. Cl.
*H04W 24/08* (2009.01)
*H04W 72/1273* (2023.01)
*H04W 80/02* (2009.01)
*H04W 72/23* (2023.01)
*H04W 72/50* (2023.01)

(52) U.S. Cl.
CPC ....... *H04W 72/1273* (2013.01); *H04W 24/08* (2013.01); *H04W 72/23* (2023.01); *H04W 72/535* (2023.01); *H04W 80/02* (2013.01)

(58) Field of Classification Search
CPC ............. H04W 72/1273; H04W 24/08; H04W 72/042; H04W 72/1257; H04W 80/02
See application file for complete search history.

(56) References Cited

U.S. PATENT DOCUMENTS

| 9,078,148 B2 | 7/2015 | Lee et al. |
| 9,386,524 B2 | 7/2016 | Feuersaenger et al. |

(Continued)

FOREIGN PATENT DOCUMENTS

| CN | 103391549 A | 11/2013 |
| CN | 103404046 A | 11/2013 |

(Continued)

OTHER PUBLICATIONS

Ericsson: "PDCCH monitoring and duplex mode operation", 3GPP Draft; R2-1810059—PDCCH Monitoring and Flexible TDD, a Technical Fields Searched (IPC) H04W vol. RAN WG2, No. Montreal, Canada; Jul. 2, 2018-Jul. 6, 2018 Jun. 22, 2018 (Jun. 22, 2018), XP051525877.

(Continued)

*Primary Examiner* — Samina F Choudhry
(74) *Attorney, Agent, or Firm* — PERKINS COIE LLP

(57) ABSTRACT

Provided are a channel monitoring method and apparatus, a terminal device and a network device. The method comprises: a terminal device receiving first search space configuration information and second search space configuration information which are sent by a network device; and the terminal device determining, on the basis of a first timer and/or first control information, to perform downlink control channel monitoring on the basis of the first search space configuration information or the second search space configuration information.

8 Claims, 4 Drawing Sheets

(56) References Cited

U.S. PATENT DOCUMENTS

| | | | |
|---|---|---|---|
| 9,491,702 | B2 | 11/2016 | Dai |
| 9,642,181 | B2 | 5/2017 | Feuersaenger et al. |
| 9,986,592 | B2 | 5/2018 | Feuersaenger et al. |
| 2014/0119198 | A1 | 5/2014 | Lee et al. |
| 2015/0003311 | A1 | 1/2015 | Feuersaenger et al. |
| 2015/0131505 | A1 | 5/2015 | Dai |
| 2016/0021658 | A1 | 1/2016 | Chen et al. |
| 2016/0205669 | A1 | 7/2016 | Kusashima et al. |
| 2016/0270146 | A1 | 9/2016 | Feuersaenger et al. |
| 2017/0202055 | A1 | 7/2017 | Feuersaenger et al. |
| 2017/0318566 | A1* | 11/2017 | Deogun ............... H04W 76/28 |
| 2018/0013528 | A1 | 1/2018 | Yamada et al. |
| 2018/0124748 | A1* | 5/2018 | Baldemair ........... H04L 5/0053 |
| 2018/0167917 | A1 | 6/2018 | Suzuki et al. |
| 2018/0249531 | A1 | 8/2018 | Feuersaenger et al. |
| 2019/0357262 | A1* | 11/2019 | Cirik .................... H04W 80/02 |
| 2020/0154467 | A1* | 5/2020 | Gong .................... H04W 76/11 |

FOREIGN PATENT DOCUMENTS

| | | |
|---|---|---|
| CN | 103918200 A | 7/2014 |
| CN | 104244417 A | 12/2014 |
| CN | 103907325 B | 5/2017 |
| CN | 108024340 A | 5/2018 |
| CN | 108200640 A | 6/2018 |
| CN | 108293252 A | 7/2018 |
| KR | 20150064016 A | 6/2015 |
| RU | 2617432 C2 | 4/2017 |
| WO | 2011040516 A1 | 4/2011 |
| WO | 2016127488 A1 | 8/2016 |
| WO | 2016204161 A1 | 12/2016 |
| WO | 2018127802 A1 | 7/2018 |

OTHER PUBLICATIONS

OPPO: "DCI-based adaptations for PDCCH", 3GPP Draft; R1-2006043, vol. RAN WG1, No. e-Meeting; Aug. 17, 2020-Aug. 28, 2020 Aug. 7, 2020 (Aug. 7, 2020), XP051917873.

Supplementary European Search Report in the European application No. 18927312.1, dated May 14, 2021.

Written Opinion of the International Search Authority in the international application No. PCT/CN2018/097001, dated Feb. 20, 2019.

OPPO. "Considerations on NR powersaving" 3GPP TSG RAN Meeting #80 RP-180834, Jun. 14, 2018 (Jun. 14, 2018), entire document.

International Search Report in the international application No. PCT/CN2018/097001, dated Feb. 20, 2019.

First Office Action of the Russian application No. 2021104440, dated Aug. 26, 2021. 13 pages with English translation.

Apt et al., R2-1801880, Clarification of PDCCH monitoring within CORESET duration, 3GPP TSG RAN WG2 #101, 3GPP (Feb. 13, 2018). 6 pages.

First Office Action of the Korean application No. 10-2021-7002626, dated Aug. 17, 2022. 12 pages with English translation.

Written Opinion of the Singaporean application No. 11202100790R, dated Sep. 29, 2022. 9 pages.

First Office Action of the Chinese application No. 202110578805.4, dated Sep. 20, 2022. 15 pages with English translation.

First Office Action of the Taiwanese application No. 108126436, dated Nov. 9, 2022. 20 pages with English translation.

Second Office Action of the Chinese application No. 202110578805.4, dated Jan. 4, 2023. 13 pages with English translation.

Second Office Action of the Japanese application No. 2021-503786, dated Jan. 17, 2023. 11 pages with English translation.

Office Action of the Indian application No. 202117003059, dated Jan. 6, 2022. 6 pages with English translation.

First Office Action of the European application No. 18927312.1, dated May 3, 2022. 6 pages.

First Office Action of the Japanese application No. 2021-503786, dated Jul. 15, 2022. 12 pages with English translation.

Institute for Information Industry (III), "The impact of BWP configuration and switching", 3GPP TSG RAN WG2 adhoc_2018_01_NR R2-1800778,Jan. 12, 2018. 5 pages.

Notice of rejection of the Japanese application No. 2021-503786, dated May 19, 2023. 11 pages with English translation.

Notice of rejection of the Taiwanese application No. 108126436, dated Mar. 23, 2023. 13 pages with English translation.

* cited by examiner

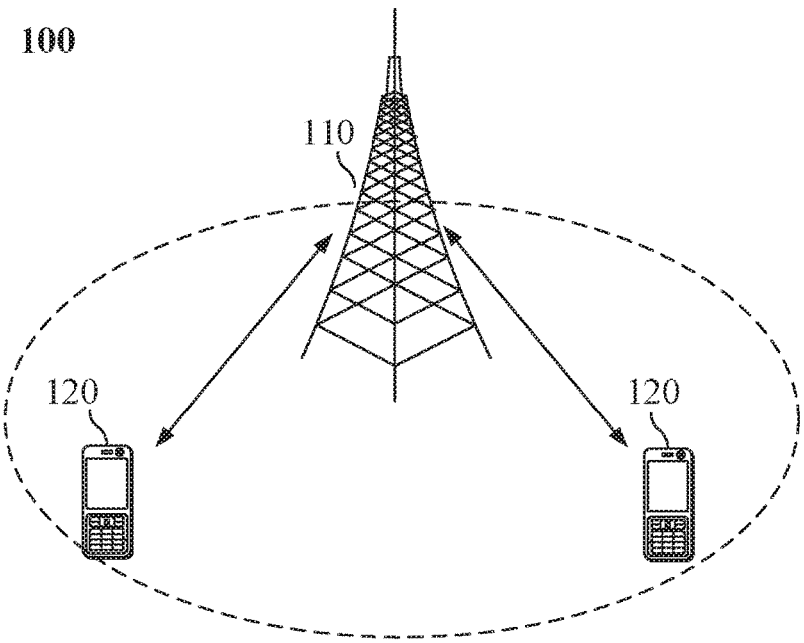

FIG. 1

```
┌─────────────────────────────────────────────────────────────┐
│ A terminal device receives first search space configuration │  201
│ information and second search space configuration           │
│ information from a network device                           │
└─────────────────────────────────────────────────────────────┘
                              │
                              ▼
┌─────────────────────────────────────────────────────────────┐
│ The terminal device determines based on a first timer and/or│  202
│ first control information to perform downlink control       │
│ channel monitoring based on the first search space          │
│ configuration information or the second search space        │
│ configuration information                                   │
└─────────────────────────────────────────────────────────────┘
```

FIG. 2

```
┌─────────────────────────────────────────────────────────────┐
│ A network device sends first search space configuration     │
│ information and second search space configuration           │
│ information to a terminal device, the first search space    │  301
│ configuration information and the second search space       │
│ configuration information being configured for the          │
│ terminal device to determine based on a first timer and/or  │
│ first control information to perform downlink control       │
│ channel monitoring based on the first search space          │
│ configuration information or the second search space        │
│ configuration information                                   │
└─────────────────────────────────────────────────────────────┘
```

FIG. 3

CHANNEL MONITORING METHOD AND APPARATUS, TERMINAL DEVICE AND NETWORK DEVICE

CROSS-REFERENCE TO RELATED APPLICATION

This application is a continuation of International Patent Application No. PCT/CN2018/097001 filed on Jul. 25, 2018, the contents of which are incorporated herein by reference in its entirety.

TECHNICAL FIELD

Embodiments of the application relate to the technical field of mobile communication, and particularly to a channel monitoring method and apparatus, a terminal device and a network device.

BACKGROUND

A 5th Generation (5G) technology is researched and standardized to make wireless broadband mobile communication have a higher peak rate, a greater transmission bandwidth and a lower transmission delay. For example, a working bandwidth of a 5G terminal device may be 100 MHz to hundreds of MHz, a data transmission rate may be at a Gbps level, and a transmission delay may be reduced to an ms level.

SUMMARY

A first aspect of the application provides a method for channel monitoring, which may include:

receiving, by a terminal device, first search space configuration information and second search space configuration information from a network device; and determining, by the terminal device, to perform downlink control channel monitoring based on the first search space configuration information or the second search space configuration information based on a first timer and/or first control information.

A second aspect of the application provides a method for channel monitoring, which may include:

sending, by a network device, first search space configuration information and second search space configuration information to a terminal device, where the first search space configuration information and the second search space configuration information are configured for the terminal device to determine to perform downlink control channel monitoring based on the first search space configuration information or the second search space configuration information based on a first timer and/or first control information.

A third aspect of the application provides an apparatus for channel monitoring, which may include a first receiving unit and a monitoring unit.

The first receiving unit may be configured to receive first search space configuration information and second search space configuration information from a network device.

The monitoring unit may be configured to determine to perform downlink control channel monitoring based on the first search space configuration information or the second search space configuration information based on a first timer and/or first control information.

A fourth aspect of the application provides an apparatus for channel monitoring, which may include a first sending unit.

The first sending unit may be configured to send first search space configuration information and second search space configuration information to a terminal device, the first search space configuration information and the second search space configuration information being configured for the terminal device to determine to perform downlink control channel monitoring based on the first search space configuration information or the second search space configuration information based on a first timer and/or first control information.

A fifth aspect of the application provides a terminal device, which may include a processor and a memory. The memory may be configured to store a computer program, and the processor may be configured to call and run the computer program stored in the memory to execute the method for channel monitoring.

A sixth aspect of the application provides a network device, which may include a processor and a memory. The memory may be configured to store a computer program, and the processor may be configured to call and run the computer program stored in the memory to execute the method for channel monitoring.

A seventh aspect of the application provides a chip, which may be configured to implement the method for channel monitoring.

Specifically, the chip may include a processor, configured to call and run a computer program in a memory to enable a device with the chip to execute the method for channel monitoring in the first or second aspect.

An eighth aspect of the application provides a computer-readable storage medium, which may be configured to store a computer program enabling a computer to execute the method for channel monitoring in the first or second aspect.

A ninth aspect of the application provides a computer program product, which may store computer program instructions that enable a computer to execute the method for channel monitoring in the first or second aspect.

A tenth aspect of the application provides a computer program, which may run in a computer to enable the computer to execute the method for channel monitoring in the first or second aspect.

BRIEF DESCRIPTION OF THE DRAWINGS

The drawings described herein are adopted to provide a further understanding to the application and form a part of the application. Schematic embodiments of the application and descriptions thereof are adopted to explain the application and not intended to form improper limits to the application. In the drawings:

FIG. 1 is an architecture diagram of a communication system according to an embodiment of the application.

FIG. 2 is a first flowchart of a channel monitoring method according to an embodiment of the application.

FIG. 3 is a second flowchart of a channel monitoring method according to an embodiment of the application.

DETAILED DESCRIPTION

Figure 4:
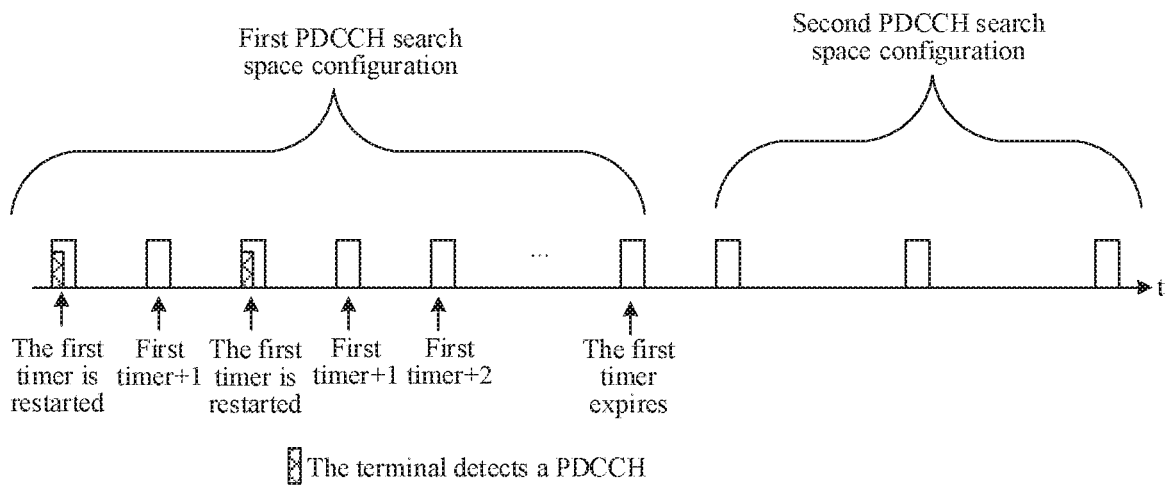
FIG. 4 is a first schematic diagram of PDCCH search space monitoring according to an embodiment of the application.

A 5th Generation (5G) technology is researched and standardized to make wireless broadband mobile communication have a higher peak rate, a greater transmission bandwidth and a lower transmission delay. For example, a working bandwidth of a 5G terminal device may be 100 MHz to hundreds of MHz, a data transmission rate may be at a Gbps level, and a transmission delay may be reduced to an ms level.

However, some problems are also brought to a terminal device in implementation and specific uses. For example, power consumption of a broadband terminal device may be increased due to radio frequencies and extremely rapid baseband processing of the terminal device, compared with that in a conventional wireless communication system. Consequently, standby time and working time of 5G terminal devices may be influenced, and even the battery life of the terminal devices may be impacted.

On the other hand, when a terminal device is in a Radio Resource Control (RRC) connected state, great unnecessary power consumption may be generated. For example, the terminal device in the RRC connected state may be required to periodically monitor a Physical Downlink Control Channel (PDCCH) search space based on a configuration of the PDCCH search space, but a network actually may initiate scheduling to the terminal device only in a small number of PDCCH transmission slots. That is, the terminal device is not scheduled in plenty of other time, namely no PDCCH for the terminal device is sent.

There is a growing need of optimizing PDCCH monitoring of a terminal device and reducing unnecessary power consumption in a PDCCH receiving process of the terminal device.

The technical solutions in the embodiments of the application will be described below in combination with the drawings in the embodiments of the application. It is apparent that the described embodiments are not all embodiments but part of embodiments of the application. All other embodiments obtained by those of ordinary skill in the art based on the embodiments in the application without creative work shall fall within the scope of protection of the application.

The technical solutions of the embodiments of the application may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Exemplarily, a communication system 100 that the embodiments of the application are applied to is shown in FIG. 1. The communication system 100 may include a network device 110. The network device 110 may be a device communicating with a terminal device 120 (or called a communication terminal device and a terminal device). The network device 110 may provide communication coverage for a specific geographical region and may communicate with a terminal device under the coverage. Optionally, the network device 110 may be a Base Transceiver Station (BTS) in the GSM or the CDMA system, or a NodeB (NB) in the WCDMA system, or an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 may further include at least one terminal device 120 within the coverage of the network device 110. A "terminal device" used herein includes, but not limited to, a device arranged to receive/send a communication signal through a wired connection, for example, through Public Switched Telephone Network (PSTN), Digital Subscriber Line (DSL), digital cable and direct cable connections, and/or through another data connection/network, and/or through a wireless interface such as, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter; and/or the terminal device can be another communication terminal, and/or an Internet of Things (IoT) device. The terminal device arranged to communicate through a wireless interface may be called a "wireless communication terminal device", a "wireless terminal device" or a "mobile terminal device". Examples of a mobile terminal device include, but not limited to, a satellite or cellular telephone, a Personal Communication System (PCS) terminal device capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device having a radio telephone transceiver. The terminal device may be an access terminal device, User Equipment (UE), a user unit, a user station, a mobile station, a mobile radio station, a remote station, a remote terminal device, a mobile device, a user terminal device, a terminal device, a wireless communication device, a user agent or a user device. The access terminal device may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, the terminal device 120 may perform Device to Device (D2D) communication.

Optionally, the 5G system or the 5G network may also be called a New Radio (NR) system or an NR network.

A network device and two terminal devices are exemplarily shown in FIG. 1. Optionally, the communication system 100 may include multiple network devices and another number of terminal devices under coverage of each network device. There are no limits made thereto in the embodiments of the application.

Optionally, the communication system 100 may further include another network entity such as a network controller and a mobility management entity. There are no limits made thereto in the embodiments of the application.

It is to be understood that a device with a communication function in the network/system in the embodiments of the application may be called a communication device. For example, for the communication system 100 shown in FIG. 1, communication devices may include the network device 110 and terminal device 120 with the communication function. The network device 110 and the terminal device 120 may be the specific devices mentioned above and will not be elaborated herein. The communication devices may further include other devices in the communication system 100, for example, other network entities like a network controller and a mobility management entity. There are no limits made thereto in the embodiments of the application.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

FIG. 2 is a first flowchart of a channel monitoring method according to an embodiment of the application. As shown in FIG. 3, the channel monitoring method includes the following operations.

In operation 201, a terminal device receives first search space configuration information and second search space configuration information from a network device.

In the embodiment of the application, the terminal device may be any device capable of communicating with the network device, such as a mobile phone, a tablet computer and a vehicle terminal device.

In the embodiment of the application, the network device may be a base station, for example, a gNB in 5G and an eNB in LTE.

In the embodiment of the application, the search space may be recorded as a PDCCH search space, and the PDCCH search space may be understood as a search space.

In the embodiment of the application, the first search space configuration information may include configuration information of one or more search spaces, and the second search space configuration information may include configuration information of one or more search spaces. The configuration information of a search space may include the following information:

a search Identifier (ID): indicating an ID of the search space;

controlResourceSetId: indicating an ID of configuration information of a control resource set associated with the search space, which configures a time-frequency resource of the PDCCH search space;

a cycle of a monitored slot and an offset in the cycle: cycles presently supported by NR include 1, 2, 4, 5, 8, 10, 16, 20, 40, 80, 160, 320, 640, 1,280 and 2,560 slots;

a duration: indicating the number of slots continuously monitored in a PDCCH search space cycle;

monitoringSymbolsWithinSlot: indicating specific symbols where PDCCH monitoring is performed in a PDCCH monitored slot;

PDCCH candidates: indicating configuration information of a PDCCH candidate; and the type of search space: indicating whether the PDCCH search space is a common search space or a UE-specific space.

In the operation 202, the terminal device determines based on a first timer and/or first control information to perform downlink control channel monitoring based on the first search space configuration information or the second search space configuration information.

Through the technical solutions, downlink control channel monitoring may be determined to be performed based on first search space configuration information or second search space configuration information based on a first timer and/or first control information. In such a manner, a terminal device may select a PDCCH search space to be monitored based on a service scheduling condition, and the terminal device may select a long-cycle PDCCH search space where there is low traffic or no service, so that power consumption for PDCCH monitoring is reduced.

In the embodiment of the application, configuration information of the first timer may be configured by the network device or predefined in a standard. Furthermore, the configuration information of the first timer may include first time length information of the first timer. For example, a value of the first time length information may be a time length, or may also be the number of subframes, or the number of slots or the number of PDCCH search space cycles. Correspondingly, timekeeping of the first timer may be counting of time, or may be counting of subframes or slots or PDCCH search space cycles.

In an implementation mode, the configuration information of the first timer may be configured by the network device. Correspondingly, the terminal device may be further required to receive the configuration information of the first timer from the network device and then determine based on the first timer to perform downlink control channel monitoring based on the first search space configuration information or the second search space configuration information.

In the embodiment of the application, the first timer has an association relationship with the first search space configuration information. Under this condition, the terminal device may run the first timer and perform downlink control channel monitoring based on a search space corresponding to the first search space configuration information. In response to detecting a downlink control channel for the terminal device at any downlink control channel monitoring time, the first timer is restarted. In response to failing to detect any downlink control channel for the terminal device, the first timer maintains timekeeping. When the first timer expires, the terminal device switches to a search space corresponding to the second search space configuration information to perform downlink control channel monitoring. Timekeeping of the first timer is taken as a downlink control channel monitoring cycle for example. In response to failing to detect any downlink control channel for the terminal device at a downlink control channel monitoring time point, a count of the first timer is increased.

For example, in a situation that the terminal device performs PDCCH monitoring based on the PDCCH search space corresponding to the first search space configuration information, every time when the terminal device detects a PDCCH for the terminal device itself, the terminal device may restart the first timer; if the terminal device does not detect the PDCCH for the terminal device in the PDCCH search space corresponding to the first search space configuration information, the count of the first timer is increased; and when the first timer expires, the terminal device may switch to the PDCCH search space corresponding to the second search space configuration information for PDCCH monitoring.

The embodiment of the application is not limited to the above solution. The first timer may also have an association relationship with the second search space configuration information. Under this condition, like the operations executed in case of the first search space configuration information, the terminal device may run the first timer and perform downlink control channel monitoring based on the search space corresponding to the second search space configuration information. In response to the terminal device detecting the downlink control channel for the terminal device, the first timer is restarted. In response to failing to detect any downlink control channel for the terminal device, the first timer maintains timekeeping. When the first timer expires, the terminal device may switch to the search space corresponding to the first search space configuration information for downlink control channel monitoring.

According to the technical solution of the embodiments of the application, whether to perform downlink control channel monitoring based on the first search space configuration information or the second search space configuration information may be determined based on the first timer. The embodiments of the application are not limited thereto. Whether to perform downlink control channel monitoring based on the first search space configuration information or the second search space configuration information may also be determined based on the first control information. Under this condition, the terminal device may receive the first control information from the network device and determine to perform downlink control channel monitoring based on the first search space configuration information or the second search space configuration information based on the first control information. The first control information may be Downlink Control Information (DCI) or a Media Access Control Control Element (MAC CE).

In an implementation mode, the terminal device may perform downlink control channel monitoring in a search space corresponding to target search space configuration information indicated by the first control information immediately when the first control information is received. The target search space configuration information indicated by the first control information may be the first search space configuration information or the second search space configuration information.

In another implementation mode, the terminal device may perform downlink control channel monitoring in the search space corresponding to the target search space configuration information indicated by the first control information after a second time length after the first control information is received. The target search space configuration information indicated by the first control information may be the first search space configuration information or the second search space configuration information. The second time length may be configured by the network device; or, the second time length may be predefined.

In the technical solution of the embodiments of the application, whether to perform downlink control channel monitoring based on the first search space configuration information or the second search space configuration information may be determined based on the first timer. Whether to perform downlink control channel monitoring based on the first search space configuration information or the second search space configuration information may also be determined based on the first control information. Whether to perform downlink control channel monitoring based on the first search space configuration information or the second search space configuration information may also be determined based on both the first timer and the first control information. In such a manner, a terminal device may select a PDCCH search space to be monitored based on a service scheduling condition, and the terminal device may select a long-cycle PDCCH search space when there is low traffic or no service, so that power consumption for PDCCH monitoring can be reduced.

FIG. 3 is a second flowchart of a channel monitoring method according to an embodiment of the application. As shown in FIG. 3, the channel monitoring method includes the following operation.

In the operation 301, a network device sends first search space configuration information and second search space configuration information to a terminal device, the first search space configuration information and the second search space configuration information being configured for the terminal device to determine based on a first timer and/or first control information to perform downlink control channel monitoring based on the first search space configuration information or the second search space configuration information.

In the embodiment of the application, the network device may be a base station, for example, a gNB in 5G and an eNB in LTE.

In the embodiment of the application, the terminal device may be any device capable of communicating with the network device, such as a mobile phone, a tablet computer and a vehicle terminal device.

In the embodiment of the application, the search space may be recorded as a PDCCH search space, and the PDCCH search space may be understood as a search space.

In the embodiment of the application, the first search space configuration information may include configuration information of one or more search spaces, and the second search space configuration information may include configuration information of one or more search spaces. The contents in the configuration information of a search space may be understood with reference to the descriptions for the terminal device side.

In the embodiment of the application, configuration information of the first timer may be configured by the network device or predefined in a standard. Furthermore, the configuration information of the first timer may include first time length information of the first timer. For example, a value of the first time length information may be a time length, or may be the number of subframes, or the number of slots or the number of PDCCH search space cycles. Correspondingly, timekeeping of the first timer may be counting of time, or may also be counting of the subframes, or the slots or the PDCCH search space cycles.

In an implementation mode, the configuration information of the first timer may be configured by the network device. Correspondingly, the network device may be further required to send the configuration information of the first timer to the terminal device, and then the terminal device may determine based on the first timer to perform downlink control channel monitoring based on the first search space configuration information or the second search space configuration information.

In the embodiment of the application, the first timer has an association relationship with the first search space configuration information. Under this condition, the terminal device may run the first timer and perform downlink control channel monitoring based on a search space corresponding to the first search space configuration information. In response to detecting a downlink control channel for the terminal device at any downlink control channel monitoring time, the first timer is restarted. In response to failing to detect any downlink control channel for the terminal device, the first timer maintains timekeeping. When the first timer expires, the terminal device may switch to a search space corresponding to the second search space configuration information to perform downlink control channel monitoring. For example, timekeeping of the first timer is taken as a downlink control channel monitoring cycle. In response to failing to detect any downlink control channel for the terminal device at a downlink control channel monitoring time point, a count of the first timer is increased.

The embodiment of the application is not limited to the above solution. The first timer may also have an association relationship with the second search space configuration information. Under this condition, like the operations executed in case of the first search space configuration information, the terminal device may run the first timer and perform downlink control channel monitoring based on the search space corresponding to the second search space configuration information. In response to detecting a downlink control channel for the terminal device, the first timer is restarted. In response to failing to detect any downlink control channel for the terminal device, the first timer maintains timekeeping. When the first timer expires, the terminal device may switch to the search space corresponding to the first search space configuration information to perform downlink control channel monitoring.

According to the technical solution of the embodiment of the application, whether to perform downlink control channel monitoring based on the first search space configuration information or the second search space configuration information may be determined based on the first timer. The embodiment of the application is not limited thereto. Whether to perform downlink control channel monitoring based on the first search space configuration information or the second search space configuration information may also be determined based on the first control information. Under this condition, the network device may send the first control information to the terminal device. The first control information is configured for the terminal device to determine to perform downlink control channel monitoring based on the first search space configuration information or the second search space configuration information. The first control information may be DCI or a MAC CE.

In an implementation mode, the terminal device may perform downlink control channel monitoring in a search space corresponding to target search space configuration information indicated by the first control information immediately when the first control information is received. The target search space configuration information indicated by the first control information may be the first search space configuration information or the second search space configuration information.

In another implementation mode, the terminal device may perform downlink control channel monitoring in the search space corresponding to the target search space configuration information indicated by the first control information after a second time length after the first control information is received. The target search space configuration information indicated by the first control information may be the first search space configuration information or the second search space configuration information. The second time length may be configured by the network device; or, the second time length may be predefined.

In the technical solution of the embodiment of the application, whether to perform downlink control channel monitoring based on the first search space configuration information or the second search space configuration information may be determined based on the first timer. Whether to perform downlink control channel monitoring based on the first search space configuration information or the second search space configuration information may also be determined based on the first control information. Whether to perform downlink control channel monitoring based on the first search space configuration information or the second search space configuration information may also be determined based on both the first timer and the first control information. In such a manner, the terminal device may select a PDCCH search space to be monitored based on a service scheduling condition, and the terminal device may select a long-cycle PDCCH search space when there is low traffic or no service, so that power consumption for PDCCH monitoring is reduced.

The technical solutions of the embodiments of the application will be exemplarily described below in combination with specific application examples. In the following embodiments, the first search space configuration information is recorded as a configuration of a first PDCCH search space, the second search space configuration information is recorded as configuration of a second PDCCH search space, and the first timer is recorded as a first timer.

Application Example 1: Monitoring PDCCH Search Space(s) Based on the First Timer The network device may send two PDCCH search space configurations to the terminal device: the first PDCCH search space configuration and the second PDCCH search space configuration. The first PDCCH search space configuration has a relatively short PDCCH search space cycle and is applicable to the condition of dense arrival of services of the terminal device. The second PDCCH search space configuration has a relatively long PDCCH search space cycle and is applicable to the condition of sparse arrival of services of the terminal device. Under the condition of relatively low traffic of the terminal device or no service in a short time, the second PDCCH search space configuration may be adopted, and the terminal device may monitor a PDCCH at a relatively long time interval, and the terminal device may be in a sleep state for short in time between two adjacent PDCCH search spaces, so that energy can be saved more for the terminal device. It is to be pointed out that the first PDCCH search space configuration or the second PDCCH search space configuration may include one or more pieces of PDCCH search space configuration information. They may include the same or different amounts of pieces of PDCCH search space configuration information. For example, the first PDCCH search space configuration may include configuration information of PDCCH search space 1, PDCCH search space 2 and PDCCH search space 3. The second PDCCH search space configuration may only include configuration information of PDCCH search space 4.

The network device may also send configuration information of the first timer to the terminal device, including time length information of the first timer. The terminal device may determine based on the first timer to perform PDCCH monitoring based on the first PDCCH search space configuration or the second PDCCH search space configuration. Specifically, when the terminal device performs PDCCH monitoring based on a PDCCH search space corresponding to the first PDCCH search space configuration, every time when the terminal device monitors the PDCCH for the terminal device, the terminal device restarts the first timer; if the terminal device does not detect the PDCCH for the terminal device in the corresponding PDCCH search space, a count of the first timer is increased; and when the first timer expires, the terminal device may switch to a PDCCH search space corresponding to the second PDCCH search space configuration for PDCCH monitoring.

The count of the first timer may be a count of time, or may also be a count of subframes, a count of slots or a count of PDCCH search space cycles. Correspondingly, a value of the first timer may be a time length, or may also be the number of the subframes, the slots or the PDCCH search space cycles. The configuration information of the first timer may also be predetermined, and under this condition, the network device is not required to send the configuration information of the first timer to the terminal device.

It is to be pointed out that the PDCCH for the terminal device may be a PDCCH scrambled by a Cell Radio Network Temporary Identifier (C-RNTI) of the terminal device.

Referring to FIG. 4, the terminal device may perform PDCCH monitoring based on the PDCCH search space corresponding to the first PDCCH search space configuration. A PDCCH may be detected at a first PDCCH monitoring time point, and the first timer is restarted. If a PDCCH is not detected at a second PDCCH monitoring time point, then 1 is added to an initial value as the count of the first timer. In response to detecting a PDCCH at a third PDCCH monitoring time point, the first timer is restarted. In response to a PDCCH being not detected at a fourth PDCCH monitoring time point, 1 is added to the initial value as the count of the first timer. In response to a PDCCH being not detected at a fifth PDCCH monitoring moment, 2 is added to the initial value as the count of the first timer. By parity of reasoning, if the PDCCH has not yet detected until an nth PDCCH monitoring time point, n is added to the initial value as the count of the first timer. When the count of the first timer expires, the terminal device may switch to the PDCCH search space corresponding to the second PDCCH search space configuration for PDCCH monitoring.

Application Example 2: Monitoring PDCCH Search Space(s) Based on the First Timer and the First Control Information For enabling the terminal device to switch between multiple PDCCH search space configurations more flexibly, a PDCCH search space configuration switching mechanism based on DCI or a MAC CE may be combined with the application example 1.

Specifically, the network, when expecting the terminal device to switch a PDCCH search space configuration, may send DCI or MAC CE signaling to the terminal device. The target PDCCH search space configuration for switching may be indicated in signaling. The terminal device, after receiving the signaling, may switch immediately or, based on effective time, switch after the effective time. The effective time may be predefined or notified to the terminal device through RRC signaling.

Before the solution is implemented, the network may configure multiple PDCCH search space configurations for the terminal device and number them respectively. When the target PDCCH search space configuration for switching is indicated by the DCI or the MAC CE, the serial number of the target PDCCH search space may be indicated.

Figure 5:
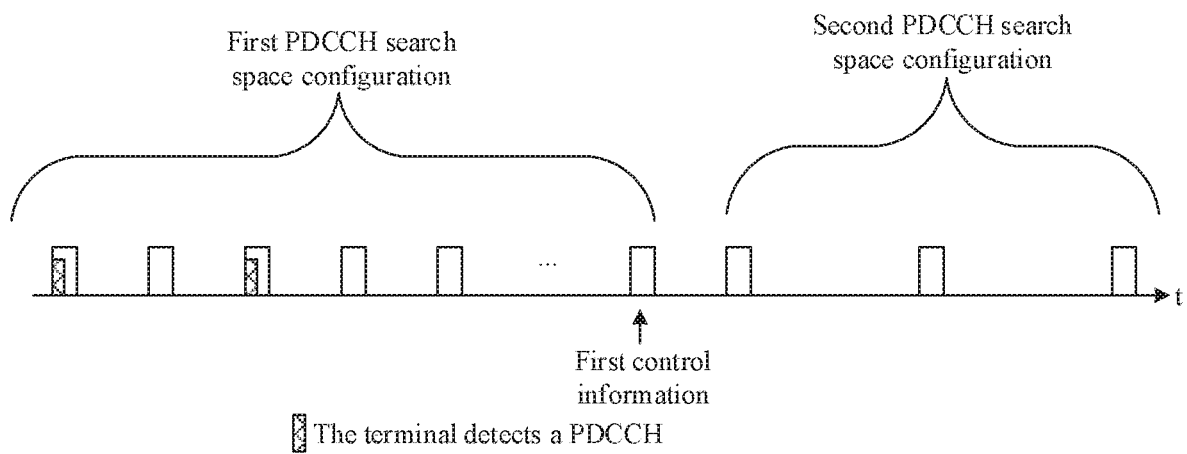
FIG. 5 is a second schematic diagram of PDCCH search space monitoring according to an embodiment of the application.

Application Example 3: Monitoring PDCCH Search Space(s) Based on the First Control Information Referring to FIG. 5, the terminal device may perform PDCCH monitoring based on the PDCCH search space corresponding to the first PDCCH search space configuration. A PDCCH is detected at a first PDCCH monitoring time point, a PDCCH is not detected at a second PDCCH monitoring time point, a PDCCH is detected at a third PDCCH monitoring time point, a PDCCH is not detected at a fourth PDCCH monitoring time point, a PDCCH is not detected at a fifth PDCCH monitoring time point, and so on. PDCCH monitoring may be performed at each PDCCH monitoring time point, until the first control information is received at an nth PDPCCH monitoring time point. Then, the terminal device may switch to the PDCCH search space corresponding to the second PDCCH search space configuration to perform PDCCH monitoring based on an indication of the first control information.

Figure 6:
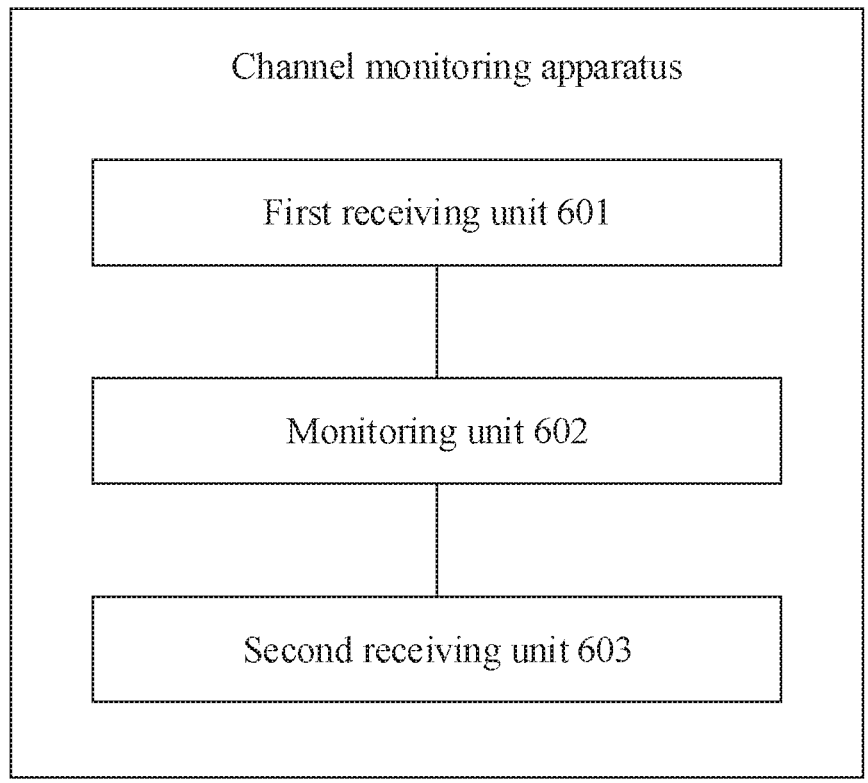
FIG. 6 is a first structure composition diagram of a channel monitoring apparatus according to an embodiment of the application.

FIG. 6 is a first structure composition diagram of a channel monitoring apparatus according to an embodiment of the application. As shown in FIG. 6, the channel monitoring apparatus includes a first receiving unit 601 and a monitoring unit 602.

The first receiving unit 601 is configured to receive first search space configuration information and second search space configuration information from a network device.

The monitoring unit 602 is configured to determine based on a first timer and/or first control information to perform downlink control channel monitoring based on the first search space configuration information or the second search space configuration information.

In an implementation mode, configuration information of the first timer may be configured by the network device; or, the configuration information of the first timer may be predefined.

In an implementation mode, the configuration information of the first timer may include first time length information of the first timer.

In an implementation mode, the monitoring unit 602 is configured to: run the first timer and perform downlink control channel monitoring based on a search space corresponding to the first search space configuration information; in response to detecting a downlink control channel for the terminal device, restart the first timer; in response to failing to detect any downlink control channel for the terminal device at any downlink control channel monitoring time, maintain the first timer to conduct timekeeping; and when the first timer expires, switch to a search space corresponding to the second search space configuration information to perform downlink control channel monitoring. Furthermore, in response to failing to detect any downlink control channel for the terminal device at a downlink control channel monitoring time point, a count of the first timer is increased.

In an implementation mode, the device may further include a second receiving unit 603.

The second receiving unit 603 is configured to receive the first control information from the network device, the first control information being DCI or a MAC CE.

In an implementation mode, the monitoring unit 602 is configured to perform downlink control channel monitoring in a search space corresponding to target search space configuration information indicated by the first control information immediately when the second receiving unit receives the first control information. The target search space configuration information indicated by the first control information may be the first search space configuration information or the second search space configuration information.

In an implementation mode, the monitoring unit 602 is configured to perform downlink control channel monitoring in the search space corresponding to the target search space configuration information indicated by the first control information after a second time length after the second receiving unit receives the first control information. The target search space configuration information indicated by the first control information may be the first search space configuration information or the second search space configuration information.

In an implementation mode, the second time length may be configured by the network device; or, the second time length may be predefined.

In an implementation mode, the first search space configuration information or the second search space configuration information may include configuration information of one or more search spaces.

It is understood by those skilled in the art that the related descriptions about the channel monitoring apparatus of the embodiments of the application may be understood with reference to the related descriptions about the channel monitoring method of the embodiments of the application.

Figure 7:
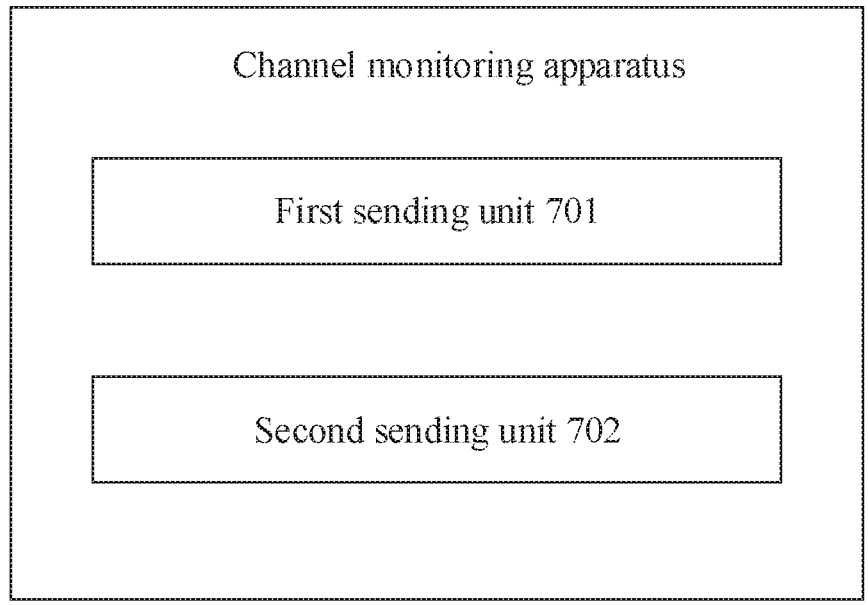
FIG. 7 is a second structure composition diagram of a channel monitoring apparatus according to an embodiment of the application.

FIG. 7 is a second structure composition diagram of a channel monitoring apparatus according to an embodiment of the application. As shown in FIG. 7, the channel monitoring apparatus includes a first sending unit 701.

The first sending unit 701 is configured to send first search space configuration information and second search space configuration information to a terminal device. The first search space configuration information and the second search space configuration information may be configured for the terminal device to determine based on a first timer and/or first control information to perform downlink control channel monitoring based on the first search space configuration information or the second search space configuration information.

In an implementation mode, configuration information of the first timer may be configured by a network device; or, the configuration information of the first timer may be predefined.

In an implementation mode, the configuration information of the first timer may include first time length information of the first timer.

In an implementation mode, the device may further include a second sending unit 702.

The second sending unit 702 is configured to send the first control information to the terminal device, the first control information being DCI or a MAC CE.

In an implementation mode, the first search space configuration information or the second search space configuration information may include configuration information of one or more search spaces.

It is understood by those skilled in the art that the related descriptions about the channel monitoring apparatus of the embodiments of the application may be understood with reference to the related descriptions about the channel monitoring method of the embodiments of the application.

Figure 8:
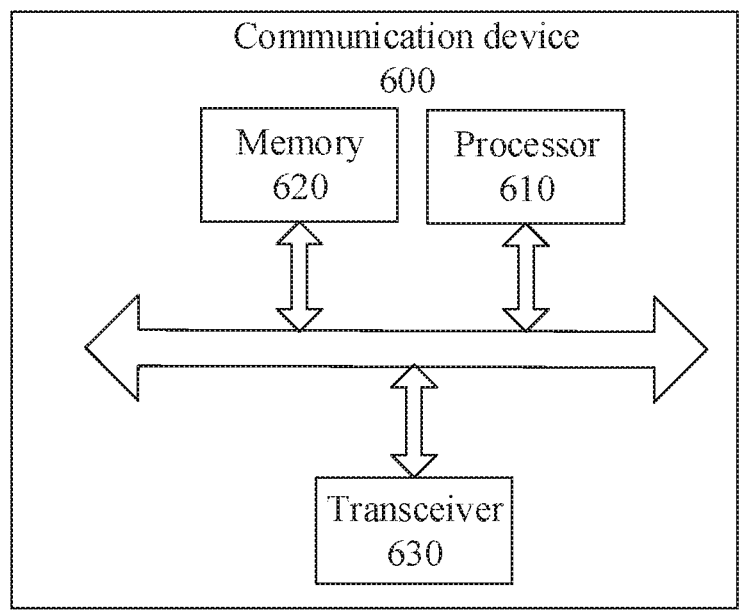
FIG. 8 is a schematic structure diagram of a communication device according to an embodiment of the application.

FIG. 8 is a schematic structure diagram of a communication device 600 according to an embodiment of the application. The communication device may be a terminal device and may also be a network device. The communication device 600 shown in FIG. 8 includes a processor 610. The processor 610 may call and run a computer program in a memory to implement the method in the embodiments of the application.

Optionally, as shown in FIG. 8, the communication device 600 may further include a memory 620. The processor 610 may call and run the computer program in the memory 620 to implement the method in the embodiments of the application.

The memory 620 may be an independent device independent of the processor 610 and may also be integrated into the processor 610.

Optionally, as shown in FIG. 8, the communication device 600 may further include a transceiver 630. The processor 610 may control the transceiver 630 to communicate with another device, specifically sending information or data to another device or receiving information or data from another device.

The transceiver 630 may include a transmitter and a receiver. The transceiver 630 may further include antennae. The number of the antennae may be one or more.

Optionally, the communication device 600 may specifically be a network device of the embodiment of the application. The communication device 600 may implement corresponding flows implemented by the network device in each method of the embodiments of the application. For simplicity, elaborations are omitted herein.

Optionally, the communication device 600 may specifically be the mobile terminal device/terminal device of the embodiments of the application. The communication device 600 may implement corresponding flows implemented by the mobile terminal device/terminal device in each method of the embodiments of the application. For simplicity, elaborations are omitted herein.

Figure 9:
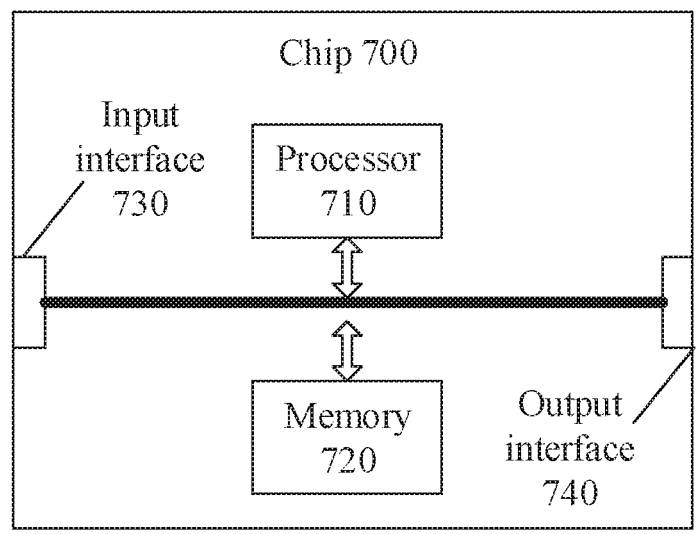
FIG. 9 is a schematic structure diagram of a chip according to another embodiment of the application.

FIG. 9 is a schematic structure diagram of a chip according to another embodiment of the application. The chip 700 shown in FIG. 9 includes a processor 710. The processor 710 may call and run a computer program in a memory to implement the method in the embodiments of the application.

Optionally, as shown in FIG. 9, the chip 700 may further include the memory 720. The processor 710 may call and run the computer program in the memory 720 to implement the method in the embodiments of the application.

The memory 720 may be an independent device independent of the processor 710 and may also be integrated into the processor 710.

Optionally, the chip 700 may further include an input interface 730. The processor 710 may control the input interface 730 to communicate with another device or chip, specifically acquiring information or data from the other device or chip.

Optionally, the chip 700 may further include an output interface 740. The processor 710 may control the output interface 740 to communicate with the other device or chip, specifically outputting information or data from the other device or chip.

Optionally, the chip may be applied to the network device of the embodiments of the application, and the chip may implement corresponding flows implemented by the network device in each method of the embodiments of the application. For simplicity, elaborations are omitted herein.

Optionally, the chip may be applied to the mobile terminal device/terminal device of the embodiment of the application, and the chip may implement corresponding flows implemented by the mobile terminal device/terminal device in each method of the embodiment of the application. For simplicity, elaborations are omitted herein.

It is to be understood that the chip mentioned in the embodiment of the application may also be called a system-level chip, a system chip, a chip system or a system on chip, etc.

Figure 10:
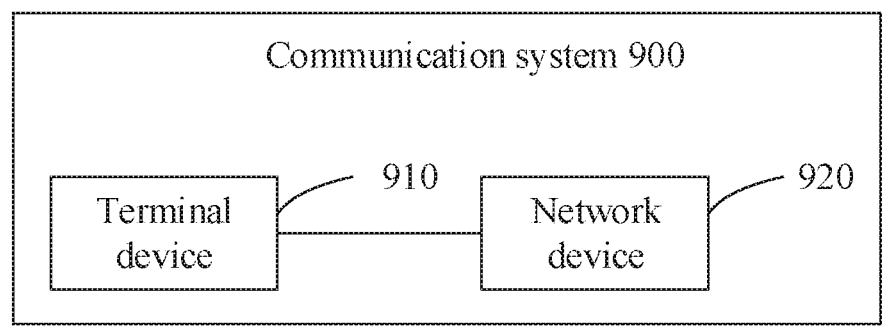
FIG. 10 is a schematic block diagram of a communication system according to an embodiment of the application.

FIG. 10 is a second block diagram of a communication system 900 according to an embodiment of the application. As shown in FIG. 10, a communication system 900 includes a terminal device 910 and a network device 920.

The terminal device 910 may be configured to implement corresponding functions realized by the terminal device in the method. The network device 920 may be configured to implement corresponding functions realized by the network device in the method. For simplicity, elaborations are omitted herein.

It is to be understood that the processor in the embodiment of the application may be an integrated circuit chip and has a signal processing capacity. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the application may be implemented or executed. The universal processor may be a microprocessor or the processor may also be any conventional processor and the like. The operations of the method described in combination with the embodiments of the application may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the method in combination with hardware.

It can be understood that the memory in the embodiment of the application may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the application may also be an SRAM, a DRAM, an SDRAM, a DDR SDRAM, an ESDRAM, an SLDRAM and a DR RAM. That is, the memory in the embodiments of the application is intended to include, but not limited to, memories of these and any other proper types.

The embodiments of the application also provide a computer-readable storage medium, which is configured to store a computer program.

Optionally, the computer-readable storage medium may be applied to a network device in the embodiments of the application. The computer program enables a computer to execute corresponding flows implemented by the network device in each method of the embodiments of the application. For simplicity, elaborations are omitted herein.

Optionally, the computer-readable storage medium may be applied to a mobile terminal device/terminal device in the embodiments of the application. The computer program enables a computer to execute corresponding flows implemented by the mobile terminal device/terminal device in each method of the embodiments of the application. For simplicity, elaborations are omitted herein.

The embodiments of the application also provide a computer program product, which stores computer program instructions.

Optionally, the computer program product may be applied to a network device in the embodiments of the application. The computer program instructions enable a computer to execute corresponding flows implemented by the network device in each method of the embodiments of the application. For simplicity, elaborations are omitted herein.

Optionally, the computer program product may be applied to a mobile terminal device/terminal device in the embodiments of the application. The computer program instructions enable the computer to execute corresponding flows implemented by the mobile terminal device/terminal device in each method of the embodiments of the application. For simplicity, elaborations are omitted herein.

The embodiments of the application also provide a computer program.

Optionally, the computer program may be applied to a network device in the embodiments of the application. The computer program may run in a computer to enable the computer to execute corresponding flows implemented by the network device in each method of the embodiments of the application. For simplicity, elaborations are omitted herein.

Optionally, the computer program may be applied to a mobile terminal device/terminal device in the embodiments of the application. The computer program may run in the computer to enable the computer to execute corresponding flows implemented by the mobile terminal device/terminal device in each method of the embodiments of the application. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method for channel monitoring, comprising:
   receiving, by a terminal device, first search space configuration information and second search space configuration information from a network device;
   receiving, by the terminal device, first control information from the network device, wherein the first control information is Downlink Control Information (DCI); and
   determining, by the terminal device based on the first control information, to perform downlink control channel monitoring based on the first search space configuration information or to perform downlink control channel monitoring based on the second search space configuration information,
   wherein determining, by the terminal device based on the first control information, to perform downlink control channel monitoring based on the first search space configuration information or to perform downlink control channel monitoring based on the second search space configuration information comprises:
   performing, by the terminal device, downlink control channel monitoring in a search space corresponding to target search space configuration information indicated by the first control information after a second time length after the first control information is received, wherein the target search space configuration information indicated by the first control information is the first search space configuration information or the second search space configuration information.

2. The method of claim 1, wherein
   the second time length is configured by the network device; or,
   the second time length is predefined.

3. The method of claim 1, wherein the first search space configuration information or the second search space configuration information comprises configuration information of one or more search spaces.

4. A method for channel monitoring, comprising:
   sending, by a network device, first search space configuration information and second search space configuration information to a terminal device;
   sending, by the network device, first control information to the terminal device, wherein the first control information is Downlink Control Information (DCI), and
   wherein the first search space configuration information and the second search space configuration information are configured for the terminal device to determine based on the first control information to perform downlink control channel monitoring based on the first search space configuration information or to perform downlink control channel monitoring based on the second search space configuration information,
   wherein the first search space configuration information and the second search space configuration information are specifically configured for the terminal device to perform downlink control channel monitoring in a search space corresponding to target search space configuration information indicated by the first control information after a second time length after the first control information is received, wherein the target search space configuration information indicated by the first control information is the first search space configuration information or the second search space configuration information.

5. An apparatus for channel monitoring, comprising:
   a processor; and
   a transceiver, connected to the processor and configured to receive and send information under control of the processor;
   wherein the transceiver is configured to receive first search space configuration information and second search space configuration information from a network device, and to receive first control information from the network device, wherein the first control information is Downlink Control Information (DCI); and
   the processor is configured to determine based on at least one of a first timer or the first control information to perform downlink control channel monitoring based on the first search space configuration information or to perform downlink control channel monitoring based on the second search space configuration information, wherein the processor is configured to perform downlink control channel monitoring in a search space corresponding to target search space configuration information indicated by the first control information after a second time length after the second receiving unit receives the first control information, wherein the target search space configuration information indicated by the first control information is the first search space configuration information or the second search space configuration information.

6. An apparatus for channel monitoring, comprising:
a processor; and
a transceiver, connected to the processor and configured to:
send first search space configuration information and second search space configuration information to a terminal device; and to
send first control information to the terminal device, wherein the first control information is Downlink Control Information (DCI), wherein
the first search space configuration information and the second search space configuration information are configured for the terminal device to determine based on the first control information to perform downlink control channel monitoring based on the first search space configuration information or to perform downlink control channel monitoring based on the second search space configuration information,
wherein the first search space configuration information and the second search space configuration information are specifically configured for the terminal device to perform downlink control channel monitoring in a search space corresponding to target search space configuration information indicated by the first control information after a second time length after the first control information is received, wherein the target search space configuration information indicated by the first control information is the first search space configuration information or the second search space configuration information.

7. The apparatus of claim 6, wherein the first search space configuration information or the second search space configuration information comprises configuration information of one or more search spaces.

8. A chip, comprising a processor configured to call and run a computer program in a memory to enable a device with the chip to execute the method of claim 1.

* * * * *